(12) United States Patent
Teranishi

(10) Patent No.: US 7,751,078 B2
(45) Date of Patent: Jul. 6, 2010

(54) ELECTRONIC DOCUMENT GENERATING APPARATUS

(75) Inventor: Takuya Teranishi, Osaka (JP)

(73) Assignee: Panasonic Corporation, Osaka (JP)

( * ) Notice: Subject to any disclaimer, the term of this patent is extended or adjusted under 35 U.S.C. 154(b) by 329 days.

(21) Appl. No.: 12/066,771

(22) PCT Filed: Mar. 8, 2007

(86) PCT No.: PCT/JP2007/054524

§ 371 (c)(1),
(2), (4) Date: Mar. 13, 2008

(87) PCT Pub. No.: WO2007/125684

PCT Pub. Date: Nov. 8, 2007

(65) Prior Publication Data

US 2009/0180136 A1 Jul. 16, 2009

(30) Foreign Application Priority Data

Apr. 27, 2006 (JP) .............................. 2006-124181

(51) Int. Cl.
G06F 3/12 (2006.01)
H04N 1/46 (2006.01)

(52) U.S. Cl. ....................... 358/1.15; 358/1.9; 358/505

(58) Field of Classification Search ................ 358/1.15, 358/1.19, 3.28, 442, 444, 468, 501, 505, 358/539; 715/200, 209; 705/19, 30, 405, 705/14.11, 14.34, 8, 1, 51, 57; 707/5
See application file for complete search history.

(56) References Cited

U.S. PATENT DOCUMENTS 6,956,662 B1 * 10/2005 Kamimura ................. 358/1.15

FOREIGN PATENT DOCUMENTS

JP   11-224296   8/1999

(Continued)

OTHER PUBLICATIONS

International Search Report issued May 29, 2007 in the International (PCT) Application of which the present application is the U.S. National Stage.

*Primary Examiner*—Dov Popovici
*Assistant Examiner*—Thomas J Lett
(74) *Attorney, Agent, or Firm*—Wenderoth, Lind & Ponack, L.L.P.

(57) ABSTRACT

Provided is an electronic document generating apparatus capable of easily generating an electronic document from a document while controlling the document per document and capable of supporting the generated electronic document to be managed per electronic document. The electronic document generating apparatus (101) includes: a document scanning unit (111) that scans a document on which a code is provided to generate image data of the scanned document; a job category information obtaining unit (116) that obtains job category information indicating a predetermined job category, from code information represented by the code; a job category unique information database (118) in which job category unique information specifying a data structure of code information for each job category is held; and a various information obtaining unit (119) that selects predetermined job category unique information identified by the job category information, from among plural job category unique information held in the job category unique information database (118) and that obtains, from the code information, various information other than the job category information according to the data structure specified by the job category unique information.

9 Claims, 9 Drawing Sheets

FOREIGN PATENT DOCUMENTS

| | | |
|---|---|---|
| JP | 2002-150111 | 5/2002 |
| JP | 2002-207622 | 7/2002 |
| JP | 2005-135211 | 5/2005 |

* cited by examiner

FIG. 6

| Job category information | Key information | Common information |
|---|---|---|
| KEIRI | Department code, Management number, Input date | Original saving flag, original paper count, the number of years to be saved, off-the-record number of years, confidential classification, two-sided printing flag, VAT refund flag |
| JINJI | AAA, BBB, CCC, DDD, EEE | Original saving flag, original paper count, the number of years to be saved, off-the-record number of years, confidential classification, two-sided printing flag, VAT refund flag |
| HOUMU | aaa, bbb, ccc, ddd | Original saving flag, original paper count, the number of years to be saved, off-the-record number of years, confidential classification, two-sided printing flag, VAT refund flag |

| KEIRI | |
|---|---|
|  | 3 sets |
| Leading character of Key information | 7th character |
| The number of characters of first Key information (department code) | 7 characters |
| The number of characters of second Key information (management number) | 8 characters |
| The number of characters of third Key information (input date) | 8 characters |

152

| JINJI | |
|---|---|
|  | 5 sets |
| Leading character of Key information | 7th character |
| The number of characters of first Key information (AAA) | 5 characters |
| The number of characters of second Key information (BBB) | 8 characters |
| The number of characters of third Key information (CCC) | 7 characters |
| The number of characters of fourth Key information (DDD) | 6 characters |
| The number of characters of fifth Key information (EEE) | 7 characters |

153

| HOUMU | |
|---|---|
|  | 4 sets |
| Leading character of Key information | 7th character |
| The number of characters of first Key information (aaa) | 6 characters |
| The number of characters of second Key information (bbb) | 8 characters |
| The number of characters of third Key information (ccc) | 7 characters |
| The number of characters of fourth Key information (ddd) | 6 characters |

150

ELECTRONIC DOCUMENT GENERATING APPARATUS

TECHNICAL FIELD

The present invention relates to electronic document generating apparatuses, and in particular to an electronic document generating apparatus capable of easily generating an electronic document from a document while controlling the document per document, using various information other than job category information and capable of supporting the generated electronic document to be managed per electronic document.

BACKGROUND ART

In recent years, with the enforcement of the e-Document law, it is now acknowledged that a document or a form for which the original must be saved as a document may be electronically saved by scanning the data into an image, if the document or the form satisfies a predetermined technical criterion. With this, various techniques with which documents are electronically saved and managed have been suggested.

Among them, for example, the following system has been suggested (for example, refer to Patent Document 1).

In the system, a workflow control table is held in advance in which destinations and operation codes correspond to identification codes each representing a category of each form (document). When scanning a form (document), the identification code provided on the form (document) is read. Based on the read identification code, the corresponding destination is selected from the held workflow control table. An operation identified by the operation code corresponding to the selected destination is executed.

Patent Reference1: Japanese Unexamined Patent Application Publication No. 11-224296

DISCLOSURE OF INVENTION

Problems that Invention is to Solve

However, when documents belong to the same category, electronic documents are generated from the documents per category of the documents without categorizing them per document. Thus, it is not possible to control processing for generating the electronic documents per document. Furthermore, since the workflow table only allows the generated electronic documents to be handled per category of the documents, there is a problem that the generated electronic documents cannot be managed per electronic document.

Thus, the present invention has been conceived in view of the aforementioned problems, and the object is to provide an electronic document generating apparatus that easily generates an electronic document from a document while controlling the document per document, and that supports the management of the generated electronic document per electronic document.

Means to Solve the Problems

In order to achieve the aforementioned object, (a) the electronic document generating apparatus according to the present invention includes: (a1) a document scanning unit that scans a predetermined document on which a predetermined code is provided so as to generate image data of the scanned document; (a2) a job category information obtaining unit that obtains job category information indicating a predetermined job category, from predetermined code information represented by the predetermined code; (a3) a job category unique information holding unit which holds job category unique information for each of job categories, the job category unique information specifying a data structure of code information represented by a code provided on a document; (a4) a job category unique information selecting unit that selects predetermined job category unique information identified by the job category information, from among plural job category unique information held by the job category unique information holding unit; and (a5) a various information obtaining unit that obtains information corresponding to details indicating an item unique to the predetermined job category, and information indicating how to handle a document and specifying an item common to plural job categories from the predetermined code information as various information according to the data structure specified by the predetermined job category unique information.

With this, since various information other than the job category information can be obtained according to the data structure specified in the job category unique information, it is possible to set various information other than the job category information according to a data structure for each job category. Furthermore, it is possible to reflect the various information other than job category information for generating and managing an electronic document. For example, by using various information other than job category information, it becomes possible to easily generate an electronic document from a document by controlling the document per document, and to support the generated electronic document to be managed per electronic document.

(b) The electronic document generating apparatus may further include: (b1) an electronic document generating unit that generates an electronic document based on the image data; (b2) a database selecting unit that selects a predetermined database identified by the job category information, from among databases corresponding to the respective job categories; and (b3) an electronic document registering unit that registers, in the predetermined database, the electronic document and the various information in association with each other.

With this, it is possible to manage an electronic document based on various information by classifying electronic documents according to each of job categories.

(c) (c1) The various information obtaining unit may obtain two-sided printing information from the predetermined code information, the two-sided printing information indicating both sides of the predetermined document have been printed, and (c2) the electronic document generating apparatus may further include: (c2-1) a backside judging unit that judges whether or not a backside of the predetermined document is to be scanned based on the two-sided printing information; and (c2-2) a backside scan controlling unit that controls the document scanning unit and that causes the document scanning unit to scan the backside of the predetermined document, when the backside judging unit judges that the backside of the predetermined document is to be scanned.

With this, when generating an electronic document, a backside of the document which is a side of the document can be automatically scanned using two-sided printing information included in the code information and the like. With this, it becomes possible to reduce a workload of the operator when generating an electronic document, and to provide the operator with a consistent operation procedure for processing various categories of documents.

(d) (d1) The said document scanning unit may scan the predetermined document per page, the various information obtaining unit may obtain original paper count information from the predetermined code information, the original paper count information indicating the number of pages of the predetermined document, and (d2) the electronic document generating apparatus may further include: (d2-1) an original paper count judging unit that judges whether or not all of the pages of the predetermined document have been scanned, based on the original paper count information; and (d2-2) a next page scan controlling unit that controls the document scanning unit and that causes the document scanning unit to scan a next page of the predetermined document, when the original paper count judging unit judges that all of the pages of the predetermined document have not been scanned.

With this, when generating an electronic document, plural pages of the document can be automatically scanned using original paper count information included in the code information and the like. With this, it becomes possible to reduce a workload of the operator when generating an electronic document, and to provide the operator with a consistent operation procedure for processing various categories of documents.

The electronic document generating apparatus may further include a display unit that displays a message, (e) (e1) the various information obtaining unit may obtain original saving information from the predetermined code information, the original saving information indicating whether or not the predetermined document is an original document to be saved, and (e2) the electronic document generating apparatus may further include: (e2-1) an original saving judging unit that judges whether or not the predetermined document is the original document to be saved, based on the original saving information; and (e2-2) an original-to-be-saved message output unit that outputs to the display unit an original-to-be-saved message indicating that the predetermined document is the original document to be saved, when the original saving judging unit judges that the predetermined document is the original document to be saved.

With this, when generating an electronic document, it is possible to notify the operator of a message indicating an original to be saved. With this, after packing documents, when generating an electronic document, it is possible to extract, from the packed documents, an object document without searching for an original document to be saved and a document eligible for a value-added tax refund.

The electronic document generating apparatus may further include a display unit that displays a message, (f) (f1) the various information obtaining unit may obtain value-added tax refund information from the predetermined code information, the value-added tax refund information indicating whether or not the predetermined document is a document eligible for a value-added tax refund, and (f2) the electronic document generating apparatus may further include: (f2-1) a value-added tax refund judging unit that judges whether or not the predetermined document is the document eligible for the value-added tax refund, based on the value-added tax refund information; and (f2-2) a value-added tax refund message output unit that outputs to the display unit a value-added tax refund message indicating that the predetermined document is the document eligible for the value-added tax refund, when the value-added tax refund judging unit judges that the predetermined document is the document eligible for the value-added tax refund.

With this, when generating an electronic document, it is possible to notify the operator of a message indicating a value-added tax refund and the like. With this, after packing documents, when generating an electronic document, it is possible to extract, from the packed documents, an object document without searching for an original document to be saved and a document eligible for a value-added tax refund.

Furthermore, the present invention is implemented not only as a electronic document generating apparatus but also: as an electronic document management system including the electronic document generating apparatus and a database; as a method for controlling the electronic document generating apparatus (hereinafter referred to as an electronic document generating method); as a program for causing a computer system to execute the electronic document generating method (hereinafter referred to as an electronic document generating program); and as a recording medium in which the electronic document generating program is recorded.

Effects of the Invention

According to the present invention, since various information other than the job category information can be obtained according to the data structure specified in the job category unique information, it is possible to set various information other than the job category information according to a data structure for each job category. Furthermore, it is possible to reflect the various information other than job category information for generating and managing an electronic document. Thus, it is possible to easily support the change and increase in a job category. For example, by using various information other than job category information, it becomes possible to easily generate an electronic document from a document by controlling the document per document, and to support the generated electronic document to be managed per electronic document.

More specifically, it is possible to perform another processing for each of electronic documents and manage the electronic documents based on various information by classifying the electronic documents according to each of job categories.

Furthermore, it is possible to automatically scan a backside of a document which is a side of the document and plural pages of a document, when generating an electronic document. With this, it becomes possible to reduce a workload of the operator when generating an electronic document, and to provide the operator with a consistent operation procedure for processing various categories of documents.

Furthermore, when generating an electronic document, it is possible to notify the operator of a message indicating an original to be saved and a value-added tax refund. With this, after packing documents, when generating an electronic document, it is possible to extract, from the packed documents, an object document without searching for an original document to be saved and a document eligible for a value-added tax refund.

BRIEF DESCRIPTION OF DRAWINGS

FIG. 6 illustrates the data structure of code information in the embodiment of the present invention;

FIG. 7 illustrates the data structure of job category unique information in the embodiment of the present invention;

NUMERICAL REFERENCES

Figure 1:
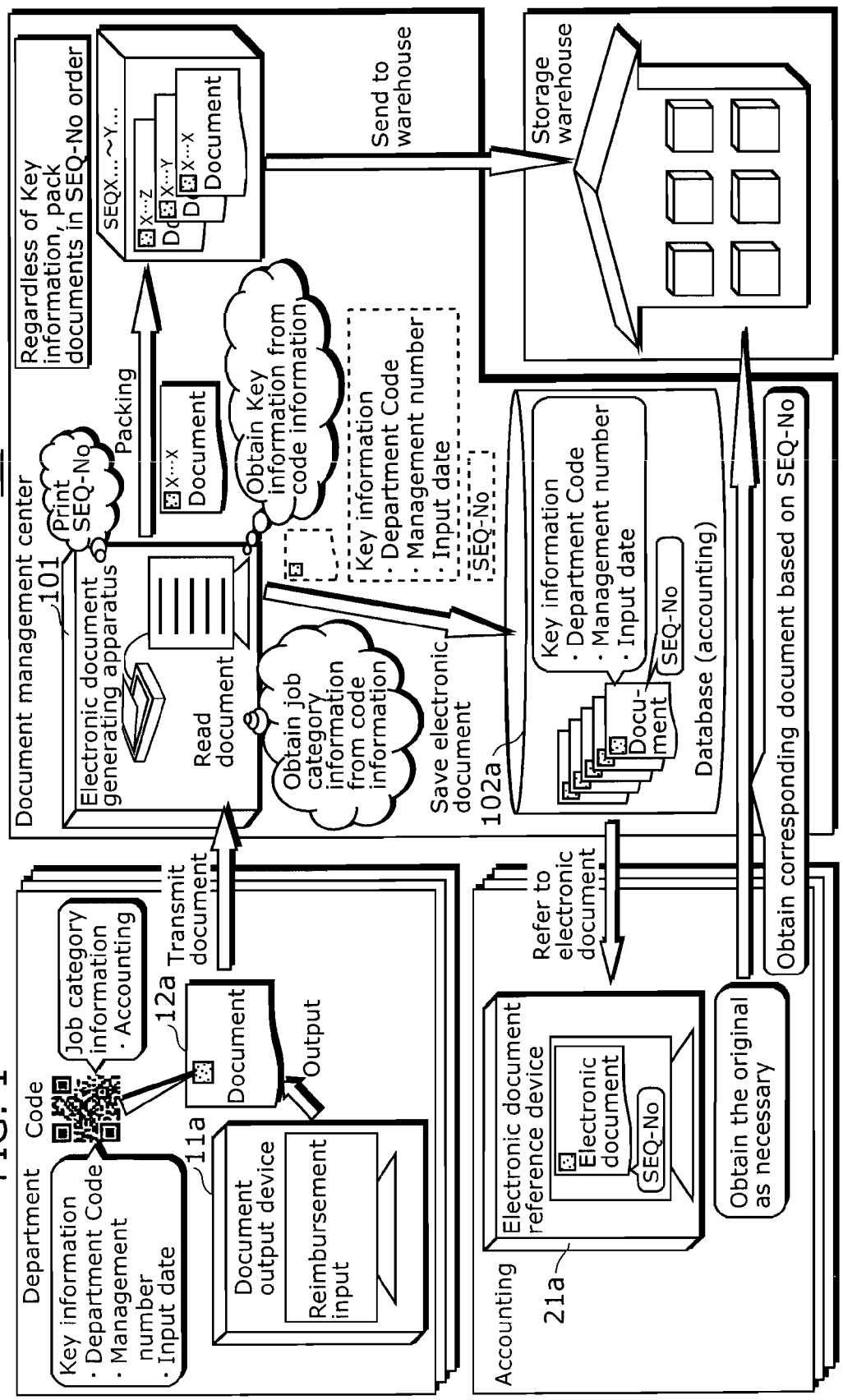
FIG. 1 illustrates an overview of the electronic document management system including the electronic document generating apparatus in the embodiment of the present invention.

11a Document output device
12a Document (accounting)
12b Document (human resources)
12c Document (legal)
21a Electronic document reference device (accounting)
21b Electronic document reference device (human resources)
21c Electronic document reference device (legal)
100 Electronic document management system
101 Electronic document generating apparatus
102a Database (accounting)
102b Database (human resources)
102c Database (legal)
111 Document scanning unit
112 Scan data storage unit
113 Code detecting unit
114 Code reading unit
115 Code information storage unit
116 Job category information obtaining unit
117 Job category information storage unit
118 Job category unique information database
119 Various information obtaining unit
120 Original saving information storage unit
121 VAT refund information storage unit
122 Two-sided printing information storage unit
123 Original paper count information storage unit
124 Key information storage unit
125 Number-of-years-to-be-saved information storage unit
126 Off-the-record number of years information storage unit
127 Confidential classification information storage unit
128 Original-to-be-saved judging unit
129 Original-to-be-saved message output unit
130 VAT refund judging unit
131 VAT refund message output unit
132 Backside judging unit
133 Backside scan controlling unit
134 Original paper count judging unit
135 Next page scan controlling unit
136 Electronic document generating unit
137 Electronic document registering unit

BEST MODE FOR CARRYING OUT THE INVENTION

Hereinafter, the embodiment of the present invention is to be described with reference to the diagrams.

(a) The electronic document generating apparatus according to the present embodiment is characterized in: (a1) scanning a predetermined document on which a predetermined code is provided so as to generate image data of the scanned document; (a2) obtaining job category information indicating a predetermined job category, from predetermined code information represented by the predetermined code; (a3) holding job category unique information for each of job categories, the job category unique information specifying a data structure of code information represented by a code provided on a document; (a4) selecting predetermined job category unique information identified by the job category information, from among plural job category unique information that are held; and (a5) obtaining, from the predetermined code information, various information other than the job category information according to the data structure specified by the predetermined job category unique information.

(b) The electronic document generating apparatus may further: (b1) generate an electronic document based on the image data; (b2) select a predetermined database identified by the job category information, from among databases corresponding to the respective job categories; and (b3) register, in the predetermined database, the electronic document and the various information in association with each other.

(c) The electronic document generating apparatus may further: (c1) obtain two-sided printing information from the predetermined code information, the two-sided printing information indicating both sides of the predetermined document have been printed; (c2) judge whether or not a backside of the predetermined document is to be scanned based on the two-sided printing information; and (c3) allow scanning the backside of the predetermined document, when the backside of the predetermined document is judged to be scanned.

(d) The electronic document generating apparatus may further: (d1) obtain original paper count information from the predetermined code information, the original paper count information indicating the number of pages of the predetermined document; and (d2) judge whether or not all of the pages of the predetermined document have been scanned, based on the original paper count information; and (d3) allow scanning a next page of the predetermined document, when it is judged that all of the pages of the predetermined document have not been scanned.

(e) The electronic document generating apparatus may further: (e1) obtain original saving information from the predetermined code information, the original saving information indicating whether or not the predetermined document is an original document to be saved; (e2) judge whether or not the predetermined document is the original document to be saved, based on the original saving information; and (e3) output an original-to-be-saved message indicating that the predetermined document is the original document to be saved, when the predetermined document is judged to be the original document to be saved.

(f) The electronic document generating apparatus may further: (f1) obtain value-added tax refund information from the predetermined code information, the value-added tax refund information indicating whether or not the predetermined document is a document eligible for a value-added tax refund; (f2) judge whether or not the predetermined document is the document eligible for the value-added tax refund, based on the value-added tax refund information; and (f3) output a value-added tax refund message indicating that the predetermined document is the document eligible for the value-added tax refund, when the predetermined document is judged to be the document eligible for the value-added tax refund.

In view of the aforementioned points, the electronic document generating apparatus in the present embodiment is to be described.

First, the electronic document management system including the electronic document generating apparatus in the present embodiment is to be described.

FIG. 1 illustrates an overview of the electronic document management system including the electronic document generating apparatus in the present embodiment. As shown in FIG. 1, an electronic document management system 100 is a system that digitizes a document outputted onto a paper and manages the digitized document.

Figure 2:
FIG. 2 illustrates an example of a document managed by the electronic document management system in the embodiment of the present invention.

More specifically, a user outputs documents created in company's activities and the like, such as documents and forms, financial statements, and confidential documents, using a document output device 11a installed in each department of a company (for example, refer to FIG. 2). The document outputted onto a paper and the like is transmitted to a document management center.

Note that since some documents are outputted to sheets and the like made of thin plastic materials and the like other than papers, as long as the documents can be outputted and read using a scanner and the like, the documents may be outputted to anything. Furthermore, a code obtained by coding job category information and various information other than the job category information is provided on any part of the document.

Furthermore, an operator digitizes a document transmitted from each department, using the electronic document generating apparatus 101 installed in the document management center, and manages the digitized document (hereinafter, referred to as electronic document).

Then, at a later date, the user refers to the electronic document managed in the document management center, using an electronic document reference device 21a and the like.

FIG. 2 illustrates an example of a document managed by the electronic document management system 100 in the present embodiment. As shown in FIG. 2, a document (accounting) 12a is an expense report, and a code is provided on the upper-left side, besides the expense details for the cash reimbursement. Other than this, there exists a document created in an accounting activity, a document created in a human resources activity, a document created in a legal activity, and the like. Furthermore, on all of these documents, a code is commonly provided on any part of the documents.

Note that codes include a QR code, a two-dimensional code other than a QR code, a bar-code, and the like. Here, a QR code is used as a code as an example.

"QR code" is a trademark of Denso Wave Incorporated.

Next, the configuration of the electronic document management system 100 in the present embodiment is to be described.

Figure 3:
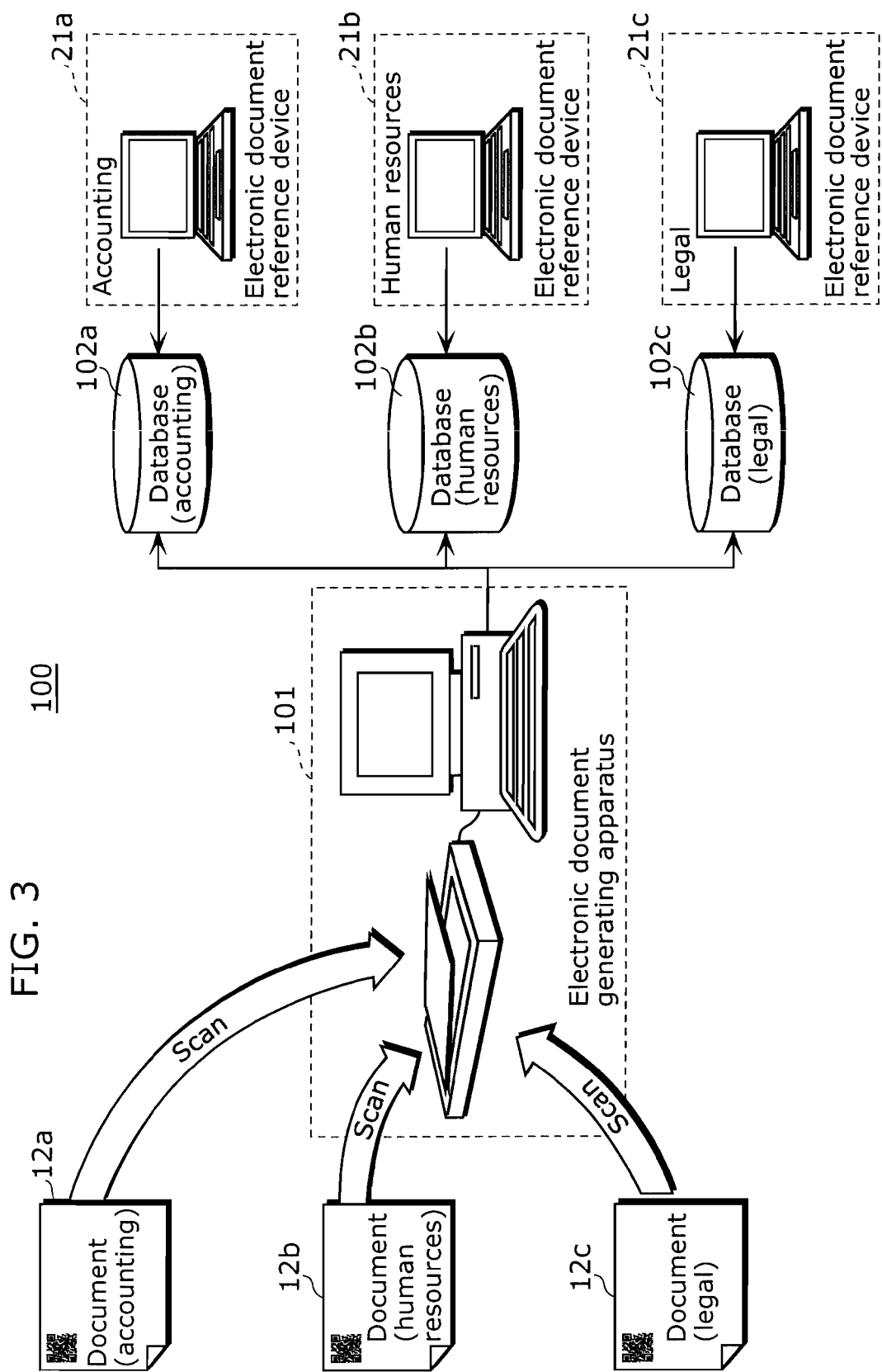
FIG. 3 illustrates the configuration of the electronic document management system in the embodiment of the present invention.

FIG. 3 illustrates the configuration of the electronic document management system 100 in the present embodiment. As shown in FIG. 3, the electronic document management system 100 includes the electronic document generating apparatus 101, and databases 102a to 102c each corresponding to a different job category.

The electronic document generating apparatus 101 reads a document transmitted from each department using a scanner, and generates the image data. An electronic document is generated from the generated image data. At this time, an identification number (SEQ-No) is allocated for each electronic document.

Furthermore, the electronic document generating apparatus 101 reads a code provided on the document, together with the document, and generates code information from the read code. From the generated code information, various information, such as job category information is obtained.

Then, the electronic document generating apparatus 101 selects a database from among plural databases prepared for each job category, based on the obtained job category information. The obtained various information and the generated electronic document are registered in the selected database, in association with each other. When the job category is accounting, the database (accounting) 102a is selected. When the job category is human resources, the database (human resources) 102b is selected. When the job category is legal, the database (legal) 102c is selected.

Note that each of the databases 102a to 102c has a function of managing electronic documents by adding a security policy to the electronic documents. More specifically, even when each of the databases 102a to 102c is accessed from each of the electronic document reference devices 21a to 21b, respectively, the access to the corresponding electronic document is controlled according to the various information registered in association with the electronic document. For example, when the number-of-years-to-be-saved information is set as the various information, the corresponding electronic document is saved during a period of the years set in the information, and when the years have passed, the electronic document is automatically deleted, or is moved to another database. When the off-the-record number of years is set as the various information, the corresponding electronic document is not disclosed during a period of the years set in the information. Furthermore, when confidential classification information is set as the various information, a browse of the corresponding electronic document is limited according to the confidential classification information. The browse may be limited based on Key information, such as a department code.

Furthermore, it is necessary to pack originals of the documents to be saved into boxes and place them in storage. Thus, the electronic document generating apparatus 101 outputs an original-to-be-saved message (for example, refer to FIG. 5A) for the document for which the original must be saved, when an electronic document is generated. Accordingly, the operator recognizes that the document read by the scanner is a document for which the original must be saved, and thus, extracts the document, packs such documents, and sends them to the warehouse. In this case, the identification number (SEQ-No) allocated for the electronic document generated from the extracted document is provided on the document as well. Then, at a later date, when the user needs to obtain the original, it is possible to obtain the corresponding document from among the documents that have been packed and placed in the storage warehouse, based on the identification number (SEQ-No) provided on the electronic document.

Furthermore, when purchasing goods abroad, the purchased goods are subject to the value-added tax (hereinafter referred to as VAT). Note that when a purchase amount of the goods is over a predetermined base amount, persons except for residents of the country can be provided with a VAT refund service. Thus, in order to receive the VAT refund service, it is necessary to pass, to a provider that provides the VAT refund service, the original of a document created in the aforementioned case, in other words, a document eligible for the VAT refund service. Thus, the electronic document generating apparatus 101 outputs a VAT refund message (for example, refer to FIG. 5B) for the document eligible for the VAT refund, when an electronic document is generated. Accordingly, the operator recognizes that the document read by the scanner is a document eligible for the VAT refund, and thus, extracts the document and passes it to the refund-service provider.

The database (accounting) 102a holds an electronic document that belongs to accounting as job category information. The database (human resources) 102b holds an electronic document that belongs to human resources as job category information. The database (legal) 102c holds an electronic document that belongs to a legal work as job category information.

Next, a configuration of the electronic document generating apparatus 101 in the present embodiment is to be described.

Figure 4:
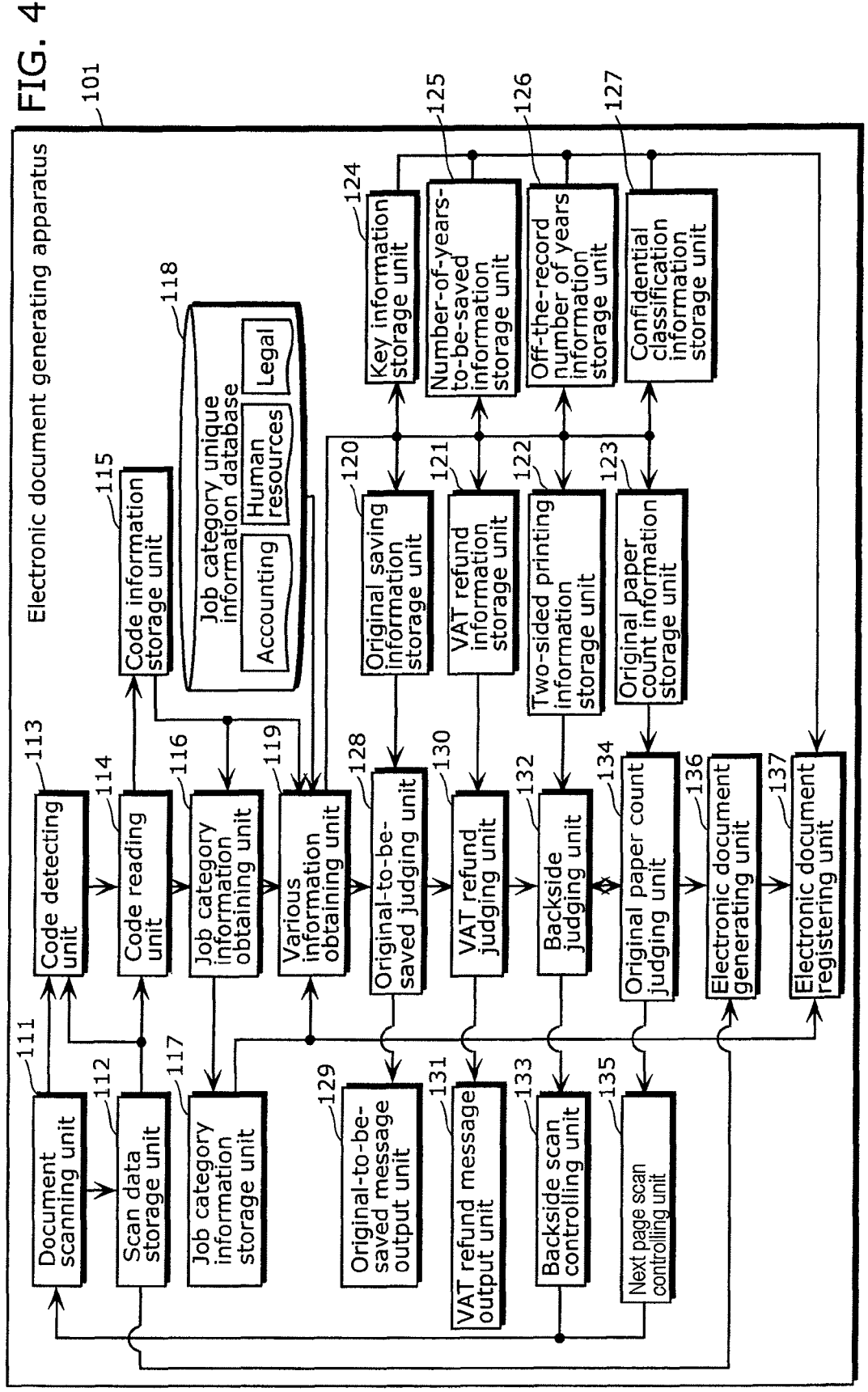
FIG. 4 illustrates the configuration of the electronic document generating apparatus in the embodiment of the present invention.

FIG. 4 illustrates the configuration of the electronic document generating apparatus 101 in the present embodiment. As shown in FIG. 4, the electronic document generating apparatus 101 includes a document scanning unit 111, a scan data storage unit 112, a code detecting unit 113, a code reading unit 114, a code information storage unit 115, a job category information obtaining unit 116, a job category information storage unit 117, a job category unique information database 118, a various information obtaining unit 119, an original saving information storage unit 120, a VAT refund information storage unit 121, a two-sided printing information storage unit 122, an original paper count information storage unit 123, a Key information storage unit 124, a number-of-years-to-be-saved information storage unit 125, an off-the-record number of years information storage unit 126, a confidential classification information storage unit 127, an original-to-be-saved judging unit 128, an original-to-be-saved message output unit 129, a VAT refund judging unit 130, a VAT refund message output unit 131, a backside judging unit 132, a backside scan controlling unit 133, an original paper count judging unit 134, a next page scan controlling unit 135, an electronic document generating unit 136, an electronic document registering unit 137, and the like.

The document scanning unit 111 scans a document and generates the image data. The document scanning unit 111 outputs the generated image data to the scan data storage unit 112 as scan data. The scan data storage unit 112 stores the scan data outputted from the document scanning unit 111.

The code detecting unit 113 analyzes the scan data stored in the scan data storage unit 112, and detects a position of a code provided on the document. The code detecting unit 113 outputs the detected position to the code reading unit 114 as position information. Upon receiving the position information outputted from the code detecting unit 113, the code reading unit 114 reads the code from the scan data stored in the scan data storage unit 112 based on the received position information, and generates code information. The code reading unit 114 outputs the generated code information to the code information storage unit 115. The code information storage unit 115 stores the code information outputted from the code reading unit 114.

The job category information obtaining unit 116 obtains job category information from the code information stored in the code information storage unit 115. The job category information obtaining unit 116 outputs the obtained job category information to the job category information storage unit 117. The job category information storage unit 117 stores the job category information outputted from the job category information obtaining unit 116.

The job category unique information database 118 holds job category unique information that specifies data structures of code information for each job category.

The various information obtaining unit 119 selects job category unique information from among plural job category unique information stored in the job category unique information database 118, based on the job category information stored in the job category information storage unit 117. Based on the selected job category unique information, the various information obtaining unit 119 obtains various information other than job category information from the code information stored in the code information storage unit 115. The various information obtaining unit 119 outputs the obtained various information to storage units, respectively. Here, the respective storage units obtain original saving information, VAT refund information, two-sided printing information, original paper count information, Key information, the number-of-years-to-be-saved information, off-the-record number of years information, and confidential classification information, as the various information.

The original saving information storage unit 120 stores the original saving information outputted from the various information obtaining unit 119. The VAT refund information storage unit 121 stores the VAT refund information outputted from the various information obtaining unit 119. The two-sided printing information storage unit 122 stores the two-sided printing information outputted from the various information obtaining unit 119. The original paper count information storage unit 123 stores the original paper count information outputted from the various information obtaining unit 119. The Key information storage unit 124 stores the Key information outputted from the various information obtaining unit 119. The number-of-years-to-be-saved information storage unit 125 stores the number-of-years-to-be-saved information outputted from the various information obtaining unit 119. The off-the-record number of years information storage unit 126 stores the off-the-record number of years information outputted from the various information obtaining unit 119. The confidential classification information storage unit 127 stores the confidential classification information outputted from the various information obtaining unit 119.

The original-to-be-saved judging unit 128 judges whether or not an original document scanned by the document scanning unit 111 is to be saved, based on the original saving information stored in the original saving information storage unit 120. The original-to-be-saved message output unit 129 outputs the original-to-be-saved message (for example, refer to FIG. 5A), when the original-to-be-saved judging unit 128 judges that the original is to be saved.

The VAT refund judging unit 130 judges whether or not the scanned document is eligible for the VAT refund, based on the VAT refund information stored in the VAT refund information storage unit 121. The VAT refund message output unit 131 outputs the VAT refund message (for example, refer to FIG. 5B), when the VAT refund judging unit 130 judges that the document is eligible for the VAT refund.

The backside judging unit 132 judges whether or not a backside of the document scanned by the document scanning unit 111 is to be scanned, based on the two-sided printing information stored in the two-sided printing information storage unit 122. The backside scan controlling unit 133 controls the document scanning unit 111, and causes it to scan a backside of the scanned document which is a side of the document, when the backside judging unit 132 judges that the backside is to be scanned.

The original paper count judging unit 134 judges whether or not all pages of the document have been scanned, based on the original paper count information stored in the original paper count information storage unit 123. The next page scan controlling unit 135 controls the document scanning unit 111, and causes it to scan the next page of the document, when the original paper count judging unit 134 judges that all pages of the document have not been scanned.

The electronic document generating unit 136 generates an electronic document by generating a single Portable Document Format (PDF) document from one or more of the scan data stored in the scan data storage unit 112. The electronic document generating unit 136 outputs the generated electronic document to the electronic document registering unit 137. Upon receiving the electronic document outputted from the electronic document generating unit 136, the electronic document registering unit 137 selects a database to be registered from among plural databases, based on the job category information stored in the job category information storage unit 117. The electronic document registering unit 137 registers the received electronic document in the selected database to be registered. As such, for example, the electronic document registering unit 137 registers the electronic document in association with the various information stored in each of the storage units, such as the Key information, the number-of-years-to-be-saved information, the off-the-record number of years information, and the confidential classification information.

Next, the original-to-be-saved message and the VAT refund message in the present embodiment are to be described.

Figure 5A:
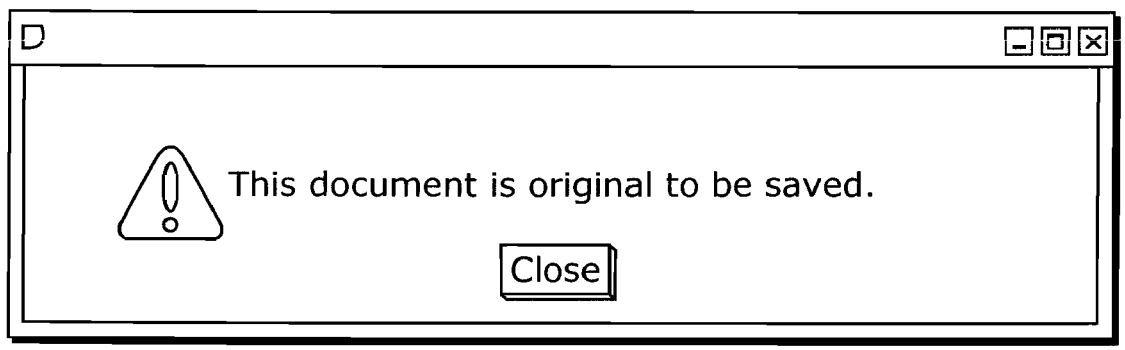
FIG. 5A illustrates an output example of the original-to-be-saved message in the embodiment of the present invention.

FIG. 5A illustrates an output example of the original-to-be-saved message in the present embodiment. As shown in FIG. 5A, the electronic document generating apparatus 101 outputs an dialog box 30 via an monitor, when scanning an original document to be saved. Then, the operator who operates the electronic document generating apparatus 101 is notified of information indicating that the scanned document is the original to be saved.

Figure 5B:
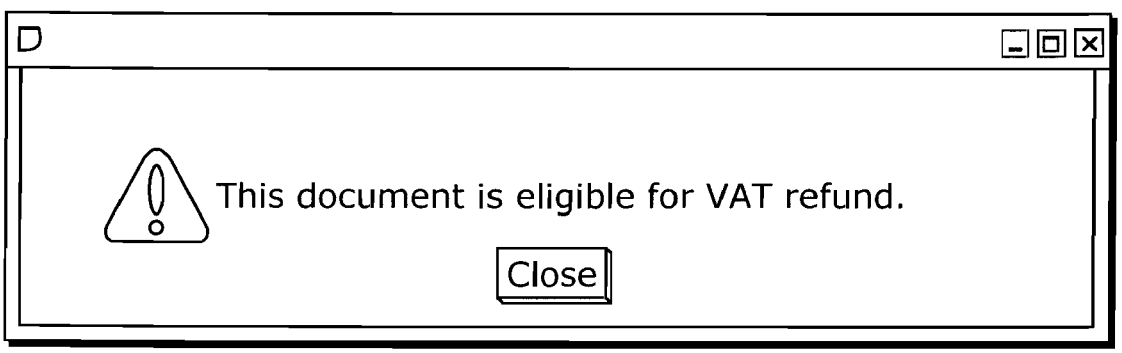
FIG. 5B illustrates an output example of the VAT refund message in the embodiment of the present invention.

FIG. 5B illustrates an output example of the VAT refund message in the present embodiment. As shown in FIG. 5B, the electronic document generating apparatus 101 outputs an dialog box 40 via an monitor, when scanning a document eligible for the VAT refund. Then, the operator who operates the electronic document generating apparatus 101 is notified of information indicating that the scanned document is eligible for the VAT refund.

Next, a structure of code information in the present embodiment is to be described.

FIG. 6 illustrates the structure of code information in the present embodiment. As shown in FIG. 6, the code information includes job category information (field 141), Key information (field 142), and common information (field 143).

The job category information (field 141) is identification information allocated to each job category. The Key information (field 142) is unique information allocated to each job category. Here, the Key information includes plural Keys that are specified for each job category. For example, code information for accounting specifies department codes, management numbers, and the input date, as the Key information (field 142).

The common information (field 143) includes common information regardless of the job categories. Here, the common information includes an original saving flag, an original paper count, the number of years to be saved, off-the-record number of years, a confidential classification, a two-sided printing flag, a VAT refund flag, and the like.

Note that the original saving flag is a flag for identifying whether or not the original is to be saved. The original paper count is the number of pages included in the original. The number of years to be saved is the number of years for which the original is to be saved. The off-the-record number of years is the number of years for which the original is confidential. The confidential classification is a classification related to confidentiality set for an electronic document, for example, a classification indicating that an electronic document may be disclosed within a company but must not be disclosed to outside of the company, and a classification indicating that the electronic document may be disclosed to a person having a predetermined title or a title superior to the predetermined title but must not be disclosed to a person having a title inferior to the predetermined title. The two-sided printing flag is a flag for identifying whether or not a backside of the document is to be scanned. The VAT refund flag is a flag for identifying whether or not the scanned document is a document eligible for the VAT refund.

Next, the job category unique information held in the job category unique information database 118 in the present embodiment is to be described.

FIG. 7 illustrates the structure of job category unique information in the present embodiment. As shown in FIG. 7, here, as an example, the job category unique information database 118 holds job category unique information (KEIRI) 151, job category unique information (JINJI) 152, and job category unique information (HOUMU) 153.

The job category unique information (KEIRI) 151 is job category unique information for accounting. Here, the job category unique information (KEIRI) 151 includes the number of Key information (3 sets), the leading character of the Key information (7th character), the number of characters of the first Key information (department code) (7 characters), the number of characters of the second Key information (management number) (8 characters), the number of characters of the third Key information (input date) (8 characters), and the like.

The job category unique information (JINJI) 152 is job category unique information for human resources. Here, the job category unique information (JINJI) 152 includes the number of Key information (5 sets), the leading character of the Key information (7th character), the number of characters of the first Key information (AAA) (5 characters), the number of characters of the second Key information (BBB) (8 characters), the number of characters of the third Key information (CCC) (7 characters), the number of characters of the fourth Key information (DDD) (6 characters), the number of characters of the fifth Key information (EEE) (7 characters), and the like.

The job category unique information (HOUMU) 153 is job category unique information for a legal work. Here, the job category unique information (HOUMU) 153 includes the number of Key information (4 sets), the leading character of the Key information (7th character), the number of characters of the first Key information (aaa) (6 characters), the number of characters of the second Key information (bbb) (8 characters), the number of characters of the third Key information (ccc) (7 characters), the number of characters of the fourth Key information (ddd) (6 characters), and the like.

As such, the data structure of the Key information differs in each job category. Even when the number of job categories is increased, it is possible to support information by only changing the job category unique information.

Next, an operation of the electronic document generating apparatus 101 in the present embodiment is to be described.

Figure 8:
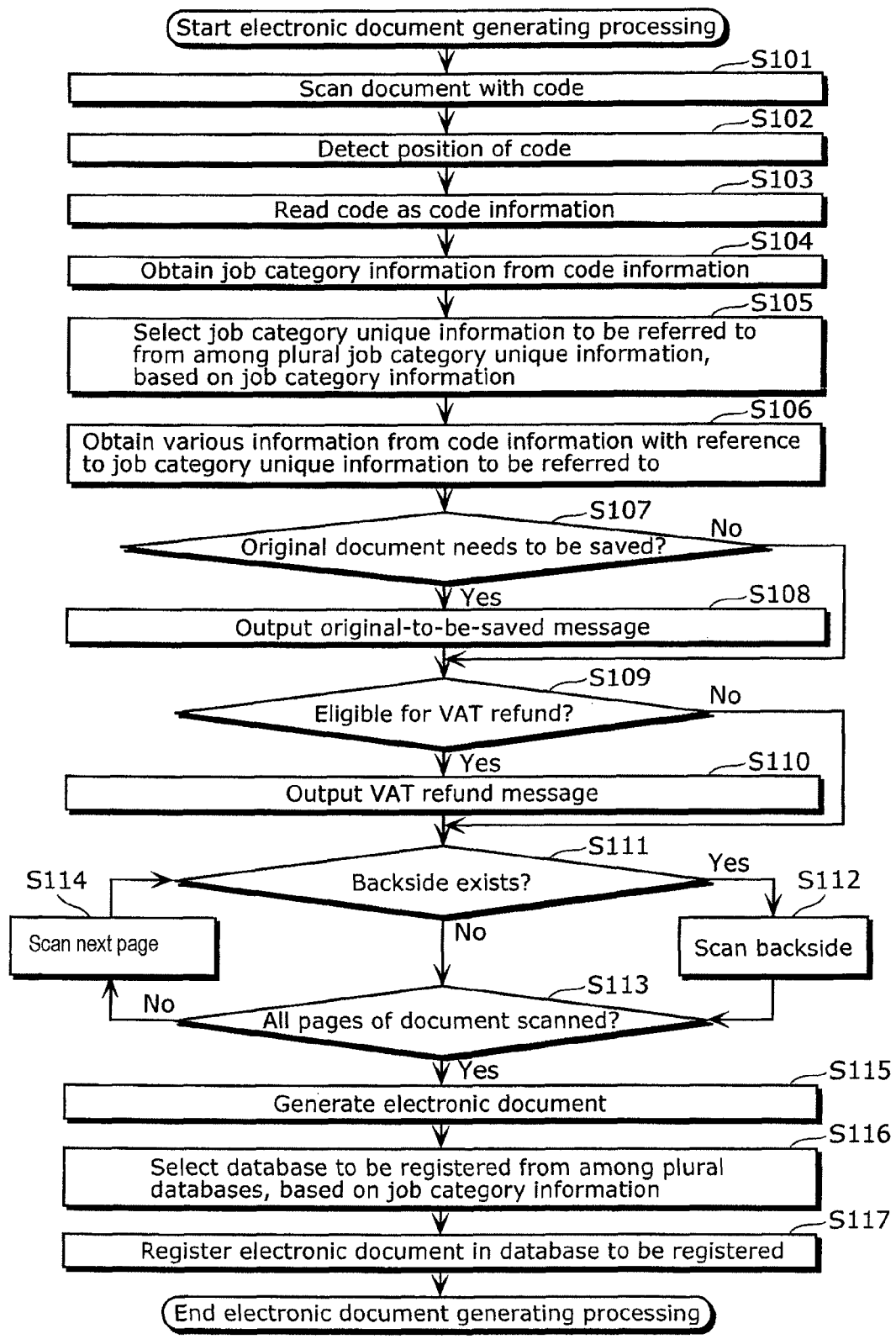
FIG. 8 illustrates electronic document generating processing to be executed in the electronic document generating apparatus in the embodiment of the present invention.

FIG. 8 illustrates electronic document generating processing to be executed in the electronic document generating apparatus 101 in the present embodiment. As shown in FIG. 8, the electronic document generating apparatus 101 executes below steps (S101) to (S117).

(S101) The document scanning unit 111 scans a document on which a code is provided and generates the image data. The document scanning unit 111 transfers the generated image data to the scan data storage unit 112 as scan data. Then, it executes the step (S102).

(S102) The code detecting unit 113 analyzes the scan data stored in the scan data storage unit 112, and detects a position of the code provided on the document. The code detecting unit 113 outputs the detected position to the code reading unit 114 as position information. Then, it executes the step (S103).

The code reading unit 114 receives the position information outputted from the code detecting unit 113, and reads the code from the scan data stored in the scan data storage unit 112 based on the received position information. The code reading unit 114 generates code information represented by codes, from the read code. The code reading unit 114 outputs the generated code information to the code information storage unit 115. Then, it executes the step (S104).

(S104) The job category information obtaining unit 116 obtains job category information from the code information stored in the code information storage unit 115. The job category information obtaining unit 116 transfers the obtained job category information to the job category information storage unit 117. Then, it executes the step (S105).

(S105) The various information obtaining unit 119 selects job category unique information to be referred to from among plural job category unique information registered in the job category unique information database 118, based on the job category information stored in the job category information storage unit 117.

(S106) The various information obtaining unit 119 obtains various information other than the job category information, from the code information stored in the code information storage unit 115, using the selected job category unique information to be referred to. The various information obtaining unit 119 transfers the obtained various information to corresponding one of the storage units. Then, it executes the step (S107).

(S107) The original-to-be-saved judging unit 128 judges whether or not an original document is to be saved, based on the original saving information stored in the original saving information storage unit 120. It executes the step (S108), when it is necessary to save the original as a result of the judgment. On the other hand, when it is not necessary to save the original, it executes the step (S109).

(S108) The original-to-be-saved message output unit 129 outputs an original-to-be-saved message indicating that the scanned document is the original to be saved. Then, it executes the step (S109).

(S109) The VAT refund judging unit 130 judges whether or not the scanned document is eligible for the VAT refund, based on the VAT refund information stored in the VAT refund information storage unit 121. It executes the step (S110), when the document is eligible for the VAT refund (S109: Yes) as a result of the judgment. On the other hand, it executes the step (S111), when the document is not eligible for the VAT refund (S109: No).

(S110) The VAT refund message output unit 131 outputs a VAT refund message indicating that the scanned document is eligible for the VAT refund. Then, it executes the step (S111).

(S111) The backside judging unit 132 judges whether or not a backside of the scanned document that is a side of the document is to be scanned, based on the two-sided printing information stored in the two-sided printing information storage unit 122. It executes the step (S112), when the backside is to be scanned (S111: Yes) as a result of the judgment. On the other hand, it executes the step (S113), when the backside is not to be scanned (S111: No).

(S112) The backside scan controlling unit 133 controls the document scanning unit 111, causes it to scan the backside of the scanned document that is a side of the document, and generates the image data. The backside scan controlling unit 133 transfers the generated image data to the scan data storage unit 112 as scan data. Then, it executes the step (S113).

(S113) The original paper count judging unit 134 judges whether or not all pages of the document have been scanned, based on the original paper count information stored in the original paper count information storage unit 123. It executes the step (S115), when all pages of the document have been scanned (S113: Yes) as a result of the judgment. On the other hand, it executes the step (S114), when all pages of the document have not been scanned (S113: No).

(S114) The next page scan controlling unit 135 controls the document scanning unit 111, causes it to scan the next page of the document, and generates the image data. The next page scan controlling unit 135 transfers the generated image data to the scan data storage unit 112 as scan data. Then, it executes the step (S111).

(S115) The electronic document generating unit 136 generates an electronic document from the scan data stored in the scan data storage unit 112. In this case, the electronic document generating unit 136 allocates an identification number, provides the allocated identification number on the image data so as to generate the electronic document. The electronic document generating unit 136 outputs the generated electronic document to the electronic document registering unit 137. Then, it executes the step (S116).

(S116) The electronic document registering unit 137 receives the electronic document outputted from the electronic document generating unit 136, and selects a database to be registered from among plural databases, based on the job category information stored in the job category information storage unit 117. When the job category information is accounting, for example, the electronic document registering unit 137 selects the database (accounting) 102*a*. When the job category information is human resources, the electronic document registering unit 137 selects the database (human resources) 102*b*. When the job category information is legal, the electronic document registering unit 137 selects the database (legal) 102*c*.

(S117) The electronic document registering unit 137 associates the received electronic document with: the Key information stored in the Key information storage unit 124; the number-of-years-to-be-saved information stored in the number-of-years-to-be-saved information storage unit 125; the off-the-record number of years information stored in the off-the-record number of years information storage unit 126; the confidential classification information stored in the confidential classification information storage unit 127; and the like, and registers the information in the selected database to be registered. Then, the electronic document generating processing ends.

Next, an example of operations in the job category information obtaining unit 116 and the various information obtaining unit 119 of the present embodiment is to be described. Here, the document (accounting) 12*a* with the code outputted using the document output device 11*a* (for example, refer to FIG. 1) and the like is to be described as an example.

Figure 9:
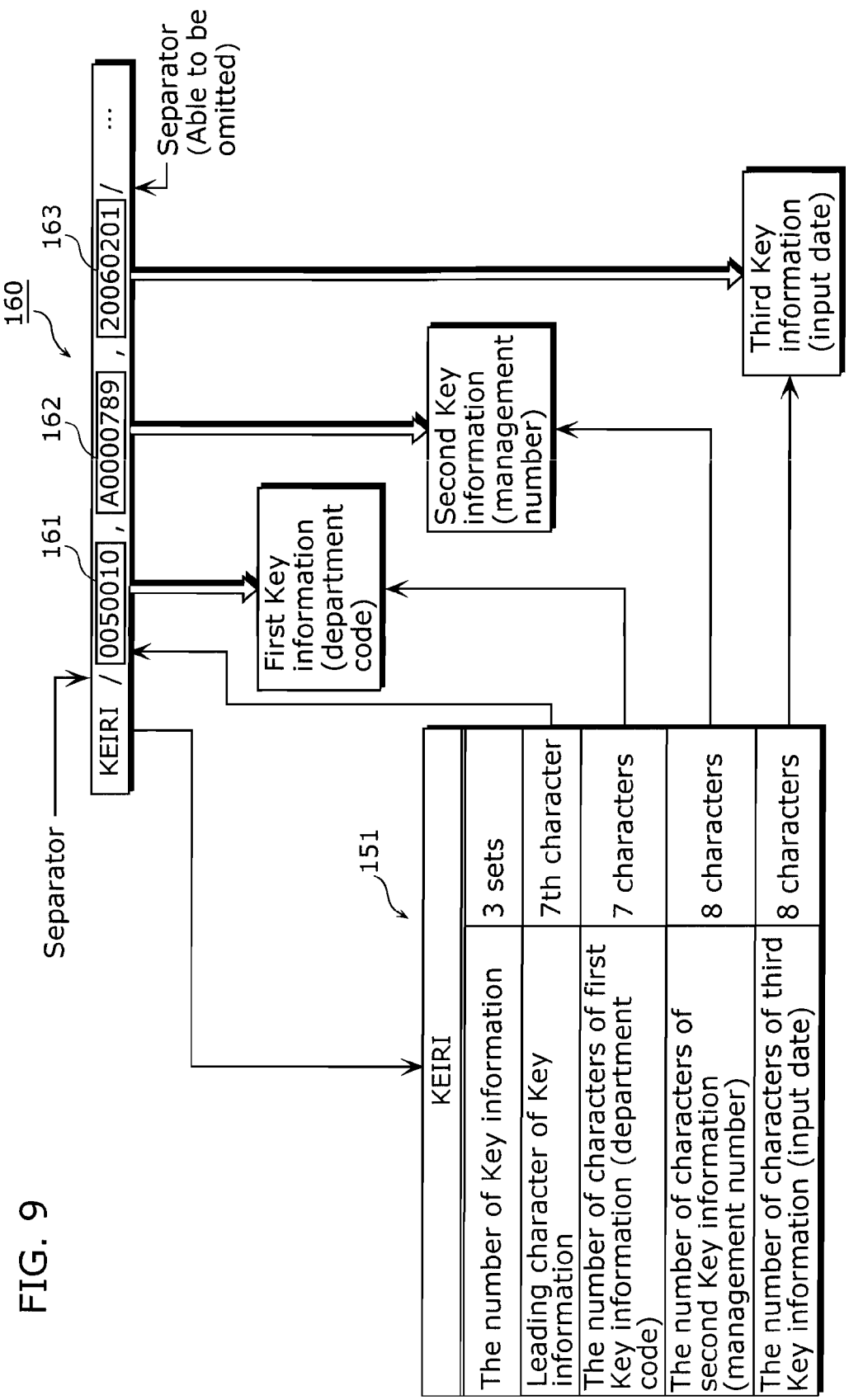
FIG. 9 illustrates an overview of the example of operations in the job category information obtaining unit and the various information obtaining unit of the embodiment of the present invention.

FIG. 9 illustrates an overview of the example of operations in the job category information obtaining unit 116 and the various information obtaining unit 119 of the present embodiment. As shown in FIG. 6, the job category information obtaining unit 116 obtains job category information from the code information 160 represented by the code provided on the document 12*a*. In this case, the job category information obtaining unit 116 obtains, as job category information, the character string (KEIRI) from the leading character of the code information 160 to a character just before the first separator. The job category information obtaining unit 116 transfers the obtained job category information (KEIRI) to the job category information storage unit 117.

Next, the various information obtaining unit 119 selects the job category unique information 151 identified by the job category information (KEIRI) stored in the job category information storage unit 117, from among a group of job category unique information 150 registered in the job category unique information database 118. While referring to the selected job category unique information 151, the various information obtaining unit 119 obtains three sets of Key information included in the code information 160. In this case, the various information obtaining unit 119 obtains, as the first Key information (department code), a character string made up of seven characters that is counted from the 7th character of the code information 160. The various information obtaining unit 119 obtains, as the second Key information (management number), a character string made up of eight characters that is counted from the 15th character (7+7+1=15) of the code information 160. The various information obtaining unit 119 obtains, as the third Key information (input date), a character string made up of eight characters that is counted from the 24th character (15+8+1=24) of the code information 160. The various information obtaining unit 119 transfers the obtained three sets of Key information to the Key information storage unit 124.

As such, it is possible to obtain unique Key information for each of the job categories, by using the job category unique information which specifies data structures for each of the job categories.

Note that a length of a character string for various information as common information (such as an original saving flag) is fixed in advance. Thus, as long as a leading character of common information is identified, consequently, it is possible to obtain various information. Therefore, the description is omitted here.

Furthermore, since it is possible to identify a boundary between Key information and common information in job category unique information, a separator between the Key information and the common information may be omitted.

Since the electronic document generating apparatus 101 of the present embodiment can obtain various information other than job category information according to the data structure specified by the job category unique information, it is possible to set the various information other than job category information in a different data structure for each of the job categories. Furthermore, it is possible to reflect the various information other than job category information for generating and managing an electronic document. For example, by using various information other than job category information, it becomes possible to easily generate an electronic document from a document by controlling the document per document, and to support the generated electronic document so as to manage it per electronic document.

More specifically, it is possible to manage electronic documents based on various information by classifying the electronic documents for each job category.

Furthermore, it is possible to automatically scan a backside of a document which is a side of the document and a document made up of plural numbers of pages, when generating an electronic document. With this, it becomes possible to reduce a workload of the operator when generating an electronic document, and to provide the operator with a consistent operation procedure for processing various categories of documents.

Furthermore, when generating an electronic document, it is possible to notify the operator of a message indicating an original to be saved and a value-added tax refund. With this, after packing documents, when generating an electronic document, it is possible to extract, from the packed documents, an object document without searching for an original document to be saved and a document eligible for a value-added tax refund.

(Other Variation)

Note that the electronic document generating apparatus may be a hardware system which includes a Central Processing Unit (CPU), a Random Access Memory (RAM), a Read Only Memory (RO M), a Hard Disk Drive (HDD), an Input/Output (I/O) interface, and the like, such as a computer system and an embedded system. Furthermore, the electronic document generating apparatus may be a system including a computer system, and a scanner and a monitor that are connected to the computer system. Furthermore, the electronic document generating apparatus may be an embedded system, such as a compound machine in which functions, such as a scanner function and a printer function are combined. Furthermore, a program that controls the electronic document generating apparatus (hereinafter, referred to as an electronic document generating program) may be installed in an HDD and the like, and each function of the electronic document generating apparatus may be implemented by executing the electronic document generating program.

Furthermore, the electronic document generating program may be recorded in a recording medium from which a hardware system, such as a computer system and an embedded system can read the program. Furthermore, the electronic document generating program may be read and implemented in other hardware systems through a recording medium. With this, it is possible to implement each function of the electronic document generating apparatus in other hardware systems. Here, computer readable recording media include an optical recording medium (for example, a CD-ROM), a magnetic recording medium (for example, a hard disk), a magnetooptical recording medium (for example, an MO), and a semiconductor memory (for example, a memory cared).

Furthermore, the electronic document generating program may be saved in a hardware system connected to a network, such as the Internet and a local area network. Furthermore, the electronic document generating program may be downloaded and implemented by other hardware systems via the network. With this, it is possible to implement each function of the electronic document generating apparatus in other hardware systems. Here, the network includes a terrestrial broadcasting network, a satellite broadcast network, a Power Line Communication (PLC), a mobile telephony network, a wire communication network (such as IEEE802.3) and a wireless communication network (such as IEEE802.11).

INDUSTRIAL APPLICABILITY

The present invention is applicable as an electronic document generating apparatus that generates an electronic document from a document, and in particular, as an electronic document generating apparatus capable of easily generating an electronic document from a document while controlling the document per document, using various information other than job category information and capable of supporting the generated electronic document to be managed per electronic document.

The invention claimed is:

1. An electronic document generating apparatus comprising:
   a document scanning unit operable to scan a predetermined document on which a predetermined code is provided so as to generate image data of the scanned document;
   a job category information obtaining unit operable to obtain job category information indicating a predetermined job category, from predetermined code information represented by the predetermined code;
   a job category unique information holding unit which holds job category unique information for each of job categories, the job category unique information specifying a data structure of code information represented by a code provided on a document;
   a job category unique information selecting unit operable to select predetermined job category unique information identified by the job category information, from among plural job category unique information held by said job category unique information holding unit; and
   a various information obtaining unit operable to obtain information corresponding to details indicating an item unique to the predetermined job category, and information indicating how to handle a document and specifying an item common to plural job categories from the predetermined code information as various information according to the data structure specified by the predetermined job category unique information.

2. The electronic document generating apparatus according to claim 1, further comprising:
   an electronic document generating unit operable to generate an electronic document based on the image data;
   a database selecting unit operable to select a predetermined database identified by the job category information, from among databases corresponding to the respective job categories; and
   an electronic document registering unit operable to register, in the predetermined database, the electronic document and the various information in association with each other.

3. The electronic document generating apparatus according to claim 1,
   wherein said various information obtaining unit is operable to obtain two-sided printing information from the predetermined code information, the two-sided printing information indicating both sides of the predetermined document have been printed, and
   said electronic document generating apparatus further comprises:
   a backside judging unit operable to judge whether or not a backside of the predetermined document is to be scanned based on the two-sided printing information; and
   a backside scan controlling unit operable to control said document scanning unit, and to cause said document scanning unit to scan the backside of the predetermined document, when said backside judging unit judges that the backside of the predetermined document is to be scanned.

4. The electronic document generating apparatus according to claim 1,
   wherein said document scanning unit is operable to scan the predetermined document per page,
   said various information obtaining unit is operable to obtain original paper count information from the predetermined code information, the original paper count information indicating the number of pages of the predetermined document, and
   said electronic document generating apparatus further comprises:
   an original paper count judging unit operable to judge whether or not all of the pages of the predetermined document have been scanned, based on the original paper count information; and
   a next page scan controlling unit operable to control said document scanning unit, and to cause said document scanning unit to scan a next page of the predetermined document, when said original paper count judging unit judges that all of the pages of the predetermined document have not been scanned.

5. The electronic document generating apparatus according to claim 1, further comprising
   a display unit operable to display a message,
   wherein said various information obtaining unit is operable to obtain original saving information from the predetermined code information, the original saving information indicating whether or not the predetermined document is an original document to be saved, and
   said electronic document generating apparatus further comprises:
   an original saving judging unit operable to judge whether or not the predetermined document is the original document to be saved, based on the original saving information; and
   an original-to-be-saved message output unit operable to output to said display unit an original-to-be-saved message indicating that the predetermined document is the original document to be saved, when said original saving judging unit judges that the predetermined document is the original document to be saved.

6. The electronic document generating apparatus according to claim 1, further comprising
   a display unit operable to display a message.,
   wherein said various information obtaining unit is operable to obtain value-added tax refund information from the predetermined code information, the value-added tax refund information indicating whether or not the predetermined document is a document eligible for a value-added tax refund, and
   said electronic document generating apparatus further comprises:
   a value-added tax refund judging unit operable to judge whether or not the predetermined document is the document eligible for the value-added tax refund, based on the value-added tax refund information; and
   a value-added tax refund message output unit operable to output to said display unit a value-added tax refund message indicating that the predetermined document is the document eligible for the value-added tax refund, when said value-added tax refund judging unit judges that the predetermined document is the document eligible for the value-added tax refund.

7. An electronic document management system comprising:
   an electronic document generating apparatus; and
   one or more of databases provided for each of job categories,
   wherein said electronic document generating apparatus includes:
   a document scanning unit operable to scan a predetermined document on which a predetermined code is provided so as to generate image data of the scanned document;

a job category information obtaining unit operable to obtain job category information indicating a predetermined job category, from predetermined code information represented by the predetermined code;

a job category unique information holding unit which holds job category unique information for each of job categories, the job category unique information specifying a data structure of code information represented by a code provided on a document;

a job category unique information selecting unit operable to select predetermined job category unique information identified by the job category information, from among plural job category unique information held by said job category unique information holding unit;

a various information obtaining unit operable to obtain information corresponding to details indicating an item unique to the predetermined job category, and information indicating how to handle a document and specifying an item common to plural job categories from the predetermined code information as various information according to the data structure specified by the predetermined job category unique information;

an electronic document generating unit operable to generate an electronic document based on the image data;

a database selecting unit operable to select a predetermined database identified by the job category information, from among databases corresponding to the respective job categories; and an electronic document registering unit operable to register, in the predetermined database, the electronic document and the various information in association with each other.

8. An electronic document generating method performed by a electronic document generating apparatus that includes a document scanning unit, a job category information obtaining unit, a job category unique information selecting unit, and a various information obtaining unit, said electronic document generating method comprising:

a document scanning step of scanning by the document scanning unit a predetermined document on which a predetermined code is provided so as to generate image data of the scanned document;

a job category information obtaining step of obtaining by the job category information obtaining unit job category information indicating a predetermined job category, from predetermined code information represented by the predetermined code;

a job category unique information selecting step of accessing a job category unique information database in which job category unique information specifying a data structure of various information represented by a code provided on a document is held for each of job categories, and selecting predetermined job category unique information identified by the job category information, from among plural job category unique information held in the job category unique information database, said job category unique information selecting step being performed by the job category unique information selecting unit; and a various information obtaining step of obtaining, by the various information obtaining unit, information indicating details unique to the predetermined job category and information indicating how to handle a document specifying items common to plural job categories from the predetermined code information as various information according to the data structure specified by the predetermined job category unique information.

9. A computer-readable recording medium in which a program is recorded, the program causing a computer to execute;

a document scanning step of scanning a predetermined document on which a predetermined code is provided so as to generate image data of the scanned document;

a job category information obtaining step of obtaining job category information indicating a predetermined job category, from predetermined code information represented by the predetermined code;

a job category unique information selecting step of accessing a job category unique information database in which job category unique information specifying a data structure of various information represented by a code provided on a document is held for each of job categories, and selecting predetermined job category unique information identified by the job category information, from among plural job category unique information held in the job category unique information database; and a various information obtaining step of obtaining information indicating details unique to the predetermined job category and information indicating how to handle a document specifying items common to plural job categories from the predetermined code information as various information according to the data structure specified by the predetermined job category unique information.

* * * * *